(12) United States Patent
Okamoto

(10) Patent No.: US 11,212,865 B2
(45) Date of Patent: Dec. 28, 2021

(54) TERMINAL APPARATUS AND TERMINAL CONTROL METHOD

(71) Applicant: FUJIFILM BUSINESS INNOVATION CORP., Tokyo (JP)

(72) Inventor: Takuya Okamoto, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 529 days.

(21) Appl. No.: 15/441,632

(22) Filed: Feb. 24, 2017

(65) Prior Publication Data

US 2018/0027606 A1 Jan. 25, 2018

(30) Foreign Application Priority Data

Jul. 19, 2016 (JP) .............................. JP2016-141377

(51) Int. Cl.
*H04W 76/27* (2018.01)
*H04W 4/02* (2018.01)

(52) U.S. Cl.
CPC .......... *H04W 76/27* (2018.02); *H04W 4/023* (2013.01)

(58) Field of Classification Search
CPC ..... H04W 88/08; H04W 24/02; H04W 88/10; G07F 17/3227; H04L 67/10; H04L 67/02
See application file for complete search history.

(56) References Cited

U.S. PATENT DOCUMENTS

| | | | | |
|---|---|---|---|---|
| 8,594,061 | B2 * | 11/2013 | Kennedy | H04W 28/26 370/338 |
| 2004/0259555 | A1 * | 12/2004 | Rappaport | H04W 16/18 455/446 |
| 2005/0210517 | A1 * | 9/2005 | Hirose | H04L 41/22 725/81 |
| 2007/0005728 | A1 * | 1/2007 | Elbury | H04L 47/10 709/218 |
| 2007/0143851 | A1 * | 6/2007 | Nicodemus | G06F 11/3495 726/25 |
| 2009/0002748 | A1 * | 1/2009 | Yamada | H04N 1/00344 358/1.15 |
| 2009/0121026 | A1 * | 5/2009 | Druker | G06K 7/10891 235/462.44 |
| 2011/0161403 | A1 * | 6/2011 | Fu | H04L 67/2842 709/203 |
| 2012/0309371 | A1 * | 12/2012 | Yamada | H04W 88/08 455/414.2 |

(Continued)

FOREIGN PATENT DOCUMENTS

| | | |
|---|---|---|
| JP | 2012-133569 A | 7/2012 |
| JP | 2013-246744 A | 12/2013 |
| JP | 2015-22520 A | 2/2015 |

OTHER PUBLICATIONS

Oct. 12, 2021 Office Action issued in Japanese Patent Application No. 2017-222148.

*Primary Examiner* — Sm A Rahman
(74) *Attorney, Agent, or Firm* — Oliff PLC

(57) ABSTRACT

A terminal apparatus includes a receiving unit that receives a designate of an environment where a set of information related to a job performed with a system connected to the terminal apparatus, and connection information used to connect to the system is taken out to and used, and a display controller that performs, prior to taking out the set, control to display determination results as to whether the system is connectable from the environment.

11 Claims, 10 Drawing Sheets

(56) References Cited

U.S. PATENT DOCUMENTS

| | | | |
|---|---|---|---|
| 2012/0311189 A1* | 12/2012 | Yamada | G06F 21/6272 709/248 |
| 2012/0330852 A1* | 12/2012 | Kochevar | G06Q 10/20 705/317 |
| 2013/0040623 A1* | 2/2013 | Chun | H04N 21/4126 455/414.2 |
| 2013/0218956 A1* | 8/2013 | Zheng | H04L 67/2861 709/203 |
| 2013/0279418 A1* | 10/2013 | Scherzer | H04W 72/02 370/328 |
| 2013/0308470 A1* | 11/2013 | Bevan | H04W 4/029 370/252 |
| 2013/0308527 A1* | 11/2013 | Chin | H04W 36/0022 370/328 |
| 2014/0280486 A1* | 9/2014 | Seay | H04L 67/10 709/203 |
| 2014/0293829 A1* | 10/2014 | Visuri | H04L 12/145 370/254 |
| 2015/0089673 A1* | 3/2015 | Beckman | H04L 63/105 726/29 |
| 2015/0256525 A1* | 9/2015 | Takaoka | H04L 63/08 726/7 |
| 2015/0288682 A1* | 10/2015 | Bisroev | G06F 3/0481 713/172 |
| 2016/0110984 A1* | 4/2016 | Seol | G08B 21/02 340/539.13 |
| 2016/0147944 A1* | 5/2016 | Douglass | G06F 19/00 705/51 |
| 2016/0156508 A1* | 6/2016 | Kim | H04L 41/22 709/220 |
| 2016/0210812 A1* | 7/2016 | Arnone | G07F 17/3223 |
| 2016/0269376 A1* | 9/2016 | Goyal | H04L 63/0492 |
| 2017/0041304 A1* | 2/2017 | Tal | G06F 1/32 |
| 2017/0272972 A1* | 9/2017 | Egner | H04W 28/0268 |
| 2018/0077022 A1* | 3/2018 | Van Oost | H04L 63/0876 |
| 2018/0300262 A1* | 10/2018 | Ellis | G06F 13/102 |
| 2019/0122565 A1* | 4/2019 | Zhao | H04W 4/021 |
| 2019/0149619 A1* | 5/2019 | Lisac | G06F 9/547 709/203 |

* cited by examiner

FIG. 7

|  | DEPOT A | DEPOT B | DEPOT C | DEPOT D |
|---|---|---|---|---|
| QUOTATION SYSTEM | YES | NO | NO | NO |
| APPROVAL SYSTEM | YES | NO | YES | NO |
| PROCUREMENT SYSTEM | NO | YES | YES | NO |
| CUSTOMER INFORMATION REGISTRATION SYSTEM | NO | YES | YES | NO |
| BUSINESS TALK PRODUCTION SYSTEM | NO | YES | YES | YES |
| CONTRACT FINALIZATION SYSTEM | NO | YES | YES | YES |

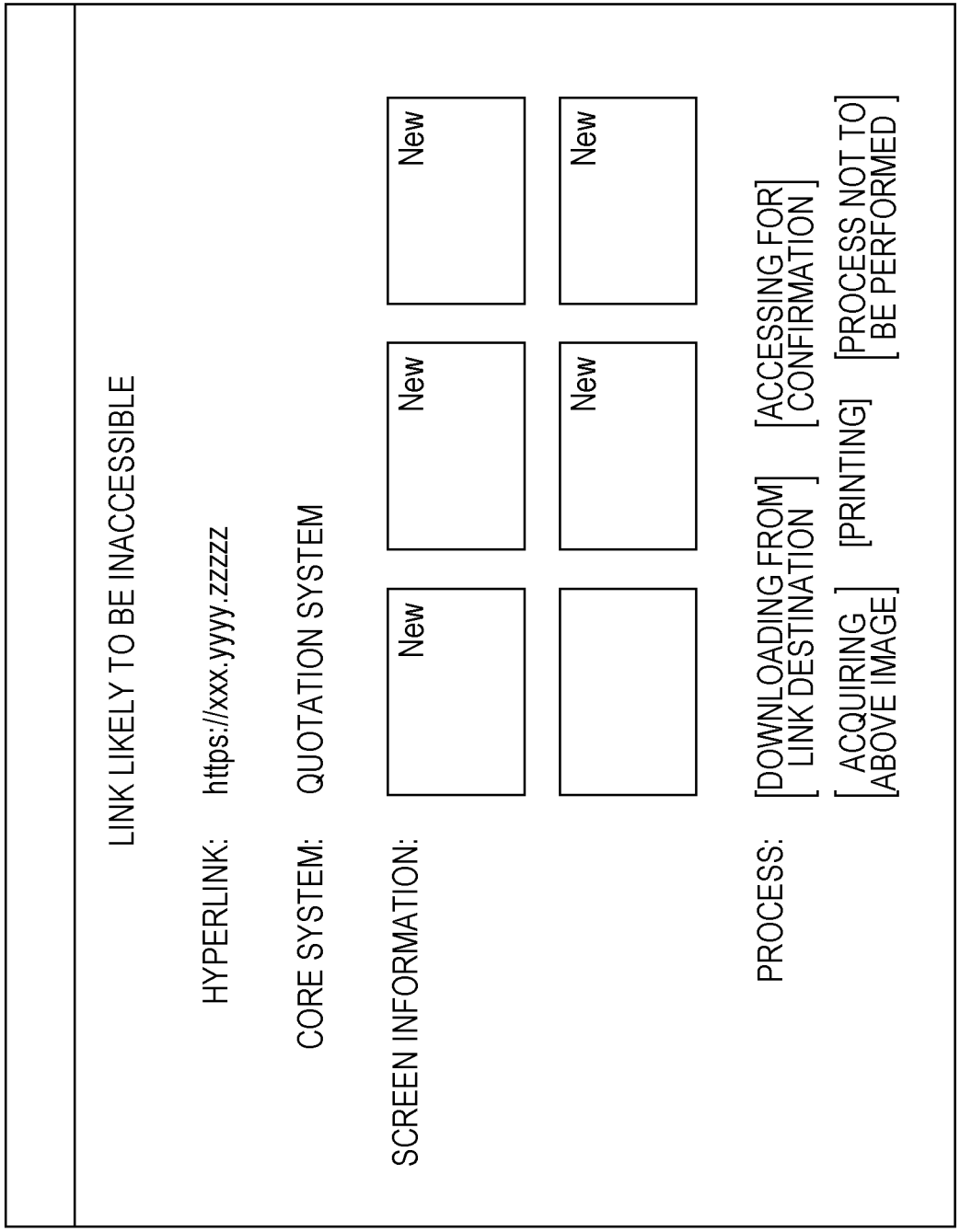

TERMINAL APPARATUS AND TERMINAL CONTROL METHOD

CROSS-REFERENCE TO RELATED APPLICATIONS

This application is based on and claims priority under 35 USC 119 from Japanese Patent Application No. 2016-141377 filed Jul. 19, 2016.

BACKGROUND

(i) Technical Field

The present invention relates to a terminal apparatus and a terminal control method.

(ii) Related Art

Environments where a series of jobs is performed on a terminal apparatus include not only a network linked environment but also a network unlinked environment where a notebook personal computer or a mobile terminal is not linked to a network. In the latter case, applications or files are not downloaded, possibly leading to a delay in a job.

Depending on the system, a job may include link information that permits access from only a specific environment, such as an in-division section or an in-house section, in a company. Information that is accessible through the Internet may not be referenced by an environment different from the Internet. As a result, a job may be delayed.

When a job is taken out by a user, an indication of whether an environment where the user is going to continuously perform the job is connectable to the system may be displayed to the user. In this way, the user may recognize in advance whether the system is connectable.

SUMMARY

According to an aspect of the invention, there is provided a terminal apparatus. The terminal apparatus includes a receiving unit that receives a designate of an environment where a set of information related to a job performed with a system connected to the terminal apparatus, and connection information used to connect to the system is taken out to and used, and a display controller that performs, prior to taking out the set, control to display determination results as to whether the system is connectable from the environment.

BRIEF DESCRIPTION OF THE DRAWINGS

Exemplary embodiments of the present invention will be described in detail based on the following figures, wherein:

FIG. 7 illustrates an example of a database file of the system of the exemplary embodiment of the present invention;

FIG. 10 illustrates a display screen example illustrating a detailed determination result of FIG. 9 in accordance with the exemplary embodiment of the present invention.

DETAILED DESCRIPTION

An exemplary embodiment of the present invention is described in detail with reference to the drawings.

Figure 1:
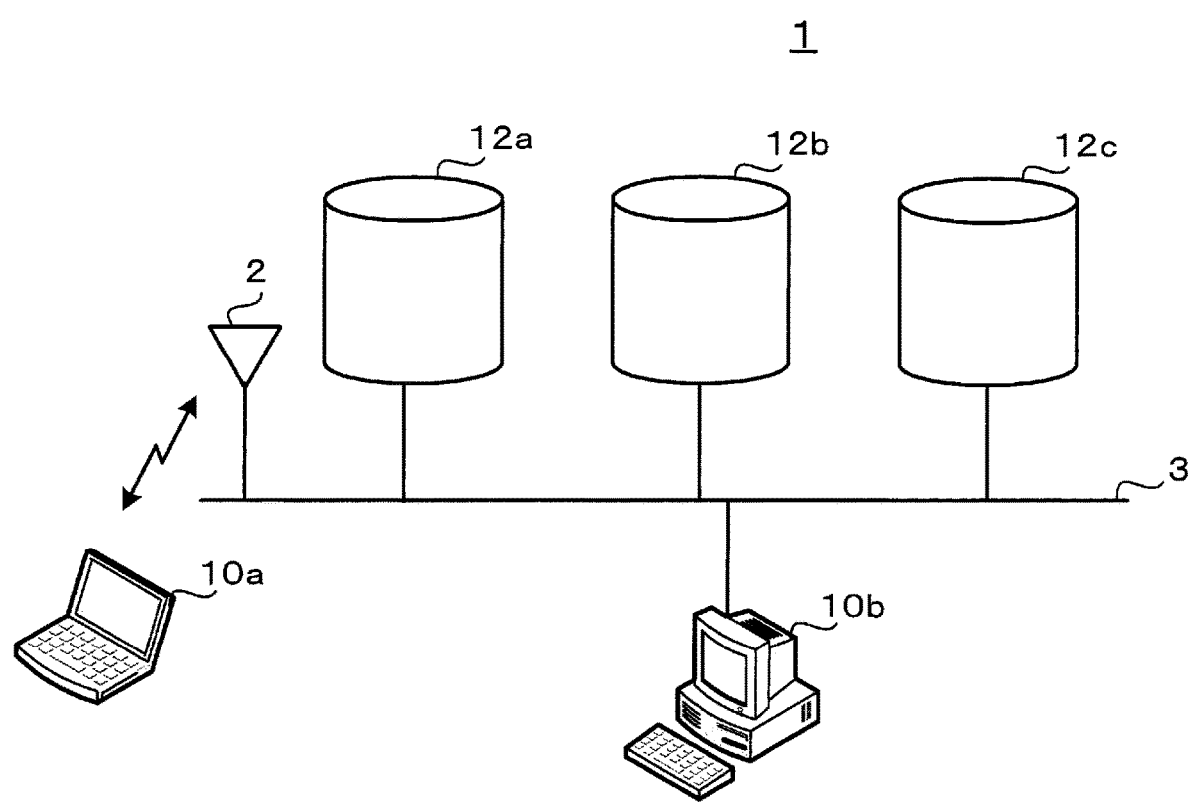
FIG. 1 illustrates a configuration of a coordinated system of an exemplary embodiment of the present invention.

FIG. 1 illustrates a configuration of a coordinated system 1 of an exemplary embodiment of the present invention.

The coordinated system 1 of the exemplary embodiment of the present invention includes plural terminal apparatuses 10a, and 10b, and plural systems 12a, 12b, and 12c as illustrated in FIG. 1.

The present invention is applicable to any of the terminal apparatuses 10a, and 10b as long as each of the terminal apparatuses 10a, and 10b is connectable to the systems 12a, 12b, and 12c via a communication network. In the exemplary embodiment, the terminal apparatus 10a is a portable apparatus, such as a personal computer, a smart phone, or a tablet terminal, and the terminal apparatus 10b is a client personal computer.

The terminal apparatus 10b and the systems 12a, 12b, and 12c are interconnected via a network 3 to exchange information. The terminal apparatus 10b remains connectable to each of the systems 12a, 12b, and 12c.

The terminal apparatus 10a is connected to and exchanges information with the systems 12a, 12b, and 12c via a wireless local-area network (LAN) terminal 2, such as a Wi-Fi router, or the Internet. Similarly, the terminal apparatus 10a is connected to and exchanges information with the terminal apparatus 10b via a wireless local-area network (LAN) terminal 2, such as a Wi-Fi router, or the Internet. The terminal apparatus 10a does not necessarily remain connectable to the systems 12a, 12b, and 12c, and may be connected to the systems 12a, 12b, and 12c depending on an environment where the terminal apparatus 10a has been taken out to.

Each of the systems 12a, 12b, and 12c stores data including a logic that is used to perform a job thereof, a screen that is used to enter an input and is referenced, a value input by a user for each job, results calculated through the logic, and a status indicating a state of software. Each of the systems 12a, 12b, and 12c includes an interface that is directly referenced or updated by one of the terminal apparatus 10a and the terminal apparatus 10b.

The terminal apparatuses 10a, and 10b store uniform resource locators (URLs) of the systems 12a, 12b, and 12c, user information, and access information as connection information related to a destination to which each of the terminal apparatuses 10a, and 10b is taken out. Each of the terminal apparatuses 10a, and 10b is designed to access the systems 12a, 12b, and 12c to acquire information related to a job to be performed. Each of the terminal apparatuses 10a, and 10b stores a range that is defined in advance and permits access to the systems 12a, 12b, and 12c. Each of the terminal apparatuses 10a, and 10b compares access range information with the access information, determines whether the systems 12a, 12b, and 12c are accessible from each of the terminal apparatuses 10a, and 10b in the takeout destination, and displays the determination results. Document edit software is installed in each of the terminal apparatuses 10a, and 10b. From each of the systems 12a, 12b, and 12c, the document edit software acquires data and screen information for the user to perform a job, and generates and stores in a data storage module 14 the data and screen information as a set to be discussed below. The document edit software also edits and produces document data, and references reference materials as reference data.

Each of the terminal apparatuses 10a, and 10b is designed to exchange data and the data storage module 14 having stored the data with each of the systems 12a, 12b, and 12c. The terminal apparatuses 10a, and 10b are collectively referred to as a terminal apparatus 10 when a common portion thereto is discussed, and the systems 12a, 12b, and 12c are collectively referred to as a system 12 when a common portion thereto is discussed.

Figure 2:
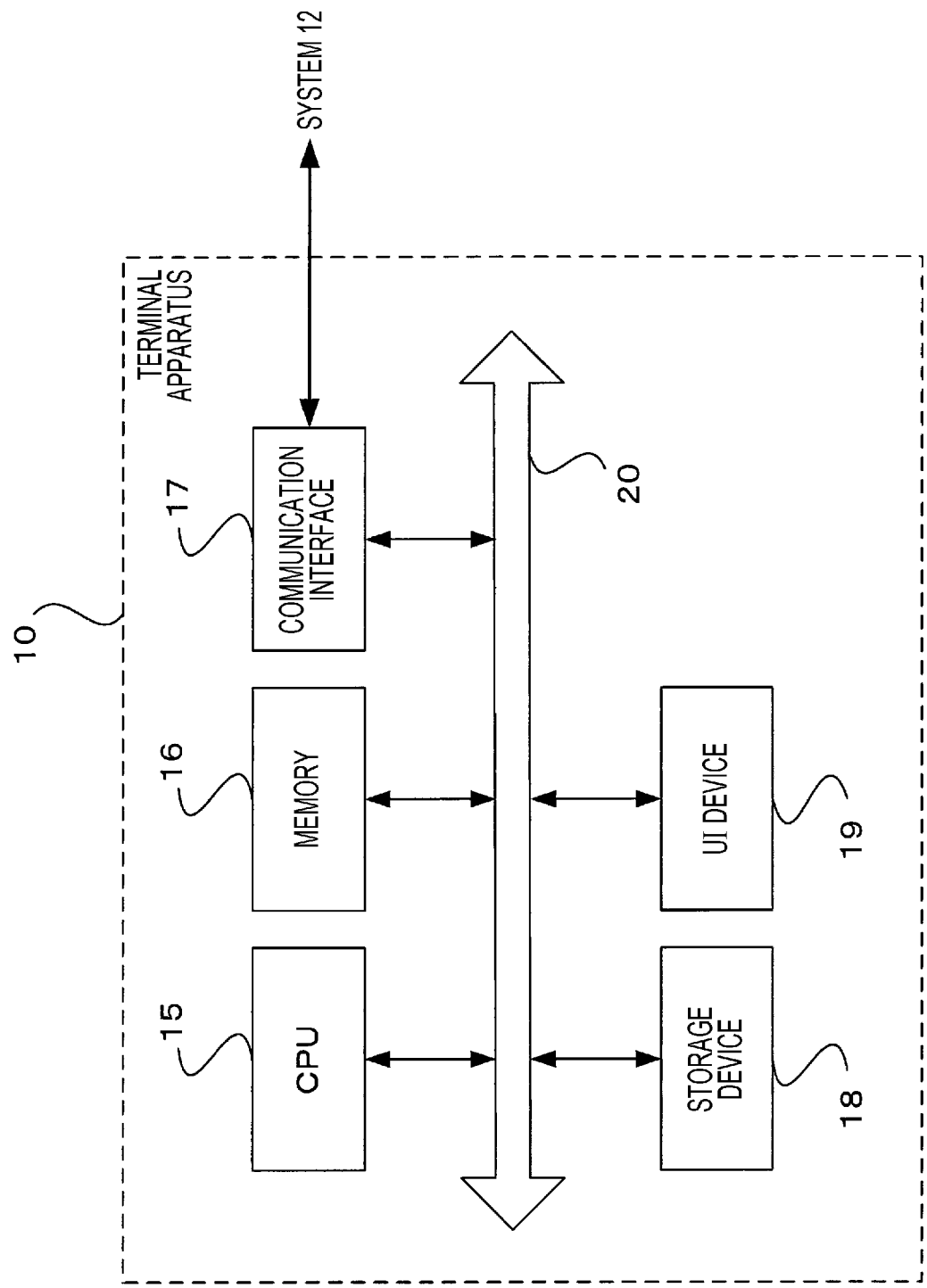
FIG. 2 is a block diagram illustrating a hardware structure of a terminal apparatus of the exemplary embodiment of the present invention.

FIG. 2 illustrates a hardware configuration of the terminal apparatus 10 in the coordinated system 1 of an exemplary embodiment of the present invention.

As illustrated in FIG. 2, the terminal apparatus 10 includes a central processing unit (CPU) 15, a memory 16, a communication interface 17 that transmits data to or receives data from an external apparatus via a network 3, a storage device 18, such as a hard disk drive (HDD), and a user interface (UI) device 19 including a touchpanel, or a liquid-crystal display, and a keyboard. These elements are interconnected via a control bus 20.

The CPU 15 controls the operation of the terminal apparatus 10 by performing a predetermined process in accordance with a control program stored on the memory 16 or the storage device 18. In accordance with the exemplary embodiment, the CPU 15 reads the control program from the memory 16 or the storage device 18 and then executes the control program. Alternatively, the control program that is stored on a storage medium, such as a compact-disk read-only memory (CD-ROM) may be supplied to the CPU 15.

Figure 3:
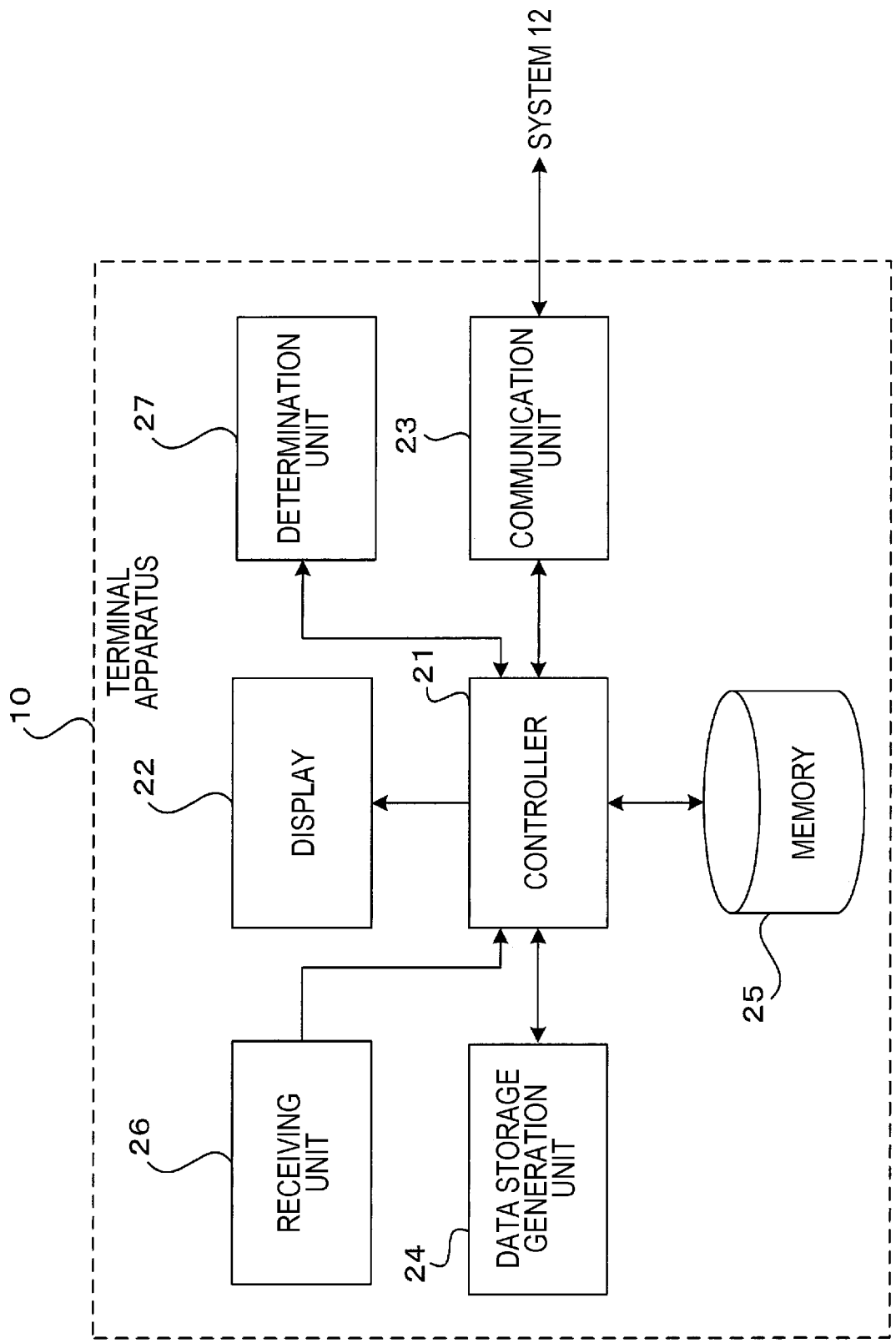
FIG. 3 is a functional block diagram illustrating the terminal apparatus of the exemplary embodiment of the present invention.

FIG. 3 is a functional block diagram illustrating the terminal apparatus 10 that is implemented when the control program is executed.

Referring to FIG. 3, the terminal apparatus 10 of the exemplary embodiment includes a controller 21, a display 22, a communication unit 23, a data storage generation unit 24, a memory 25, a receiving unit 26, and a determination unit 27.

The receiving unit 26 receives an input from a user.

The memory 25 stores access information to the system 12, and screen information obtained when the terminal apparatus 10 accesses the system 12. The memory 25 also stores access enabled ranges of plural systems 12. The memory 25 further stores an operation log of series of operations related to past jobs.

Under the control of the controller 21, the display 22 displays data or the like, related to a series of jobs stored in the data storage module 14. The display 22 also displays a screen presented when the terminal apparatus 10 accesses the system 12 or screen information stored on the memory 25.

Under the control of the controller 21, the communication unit 23 communicates with the system 12.

Under the control of the controller 21, the data storage generation unit 24 associates and combines a series of operation logs stored on the memory 25, data such as access information to each system 12, and screen information of each system 12 into a single file as the data storage module 14. The data storage generation unit 24 thus outputs a single file as the data storage module 14.

By expanding the data storage module 14, the controller 21 performs control to display, on the display 22, data related to the series of jobs stored in the data storage module 14.

The determination unit 27 determines whether the terminal apparatus 10a in an environment (takeout destination), a designate of which is received by the receiving unit 26, is able to access the system 12.

The controller 21 performs control to display determination results as to whether the terminal apparatus 10a is able to access the system 12. The controller 21 also acquires screen information of a link destination of the system 12 that is determined to be inaccessible, and performs control to display on the display 22 a screen that prompts a user to determine whether the screen information is needed for takeout. Concerning the link destination the user has determined to be needed, the controller 21 performs control to download data, to print the data, and to convert data into digital data in response to the user's choice. Concerning the link destination the user has determined not to be needed, the controller 21 determines that the link destination is not used, and performs control to display the screen with a priority of the link destination lowered when the screen is displayed next time and later.

Figure 4:
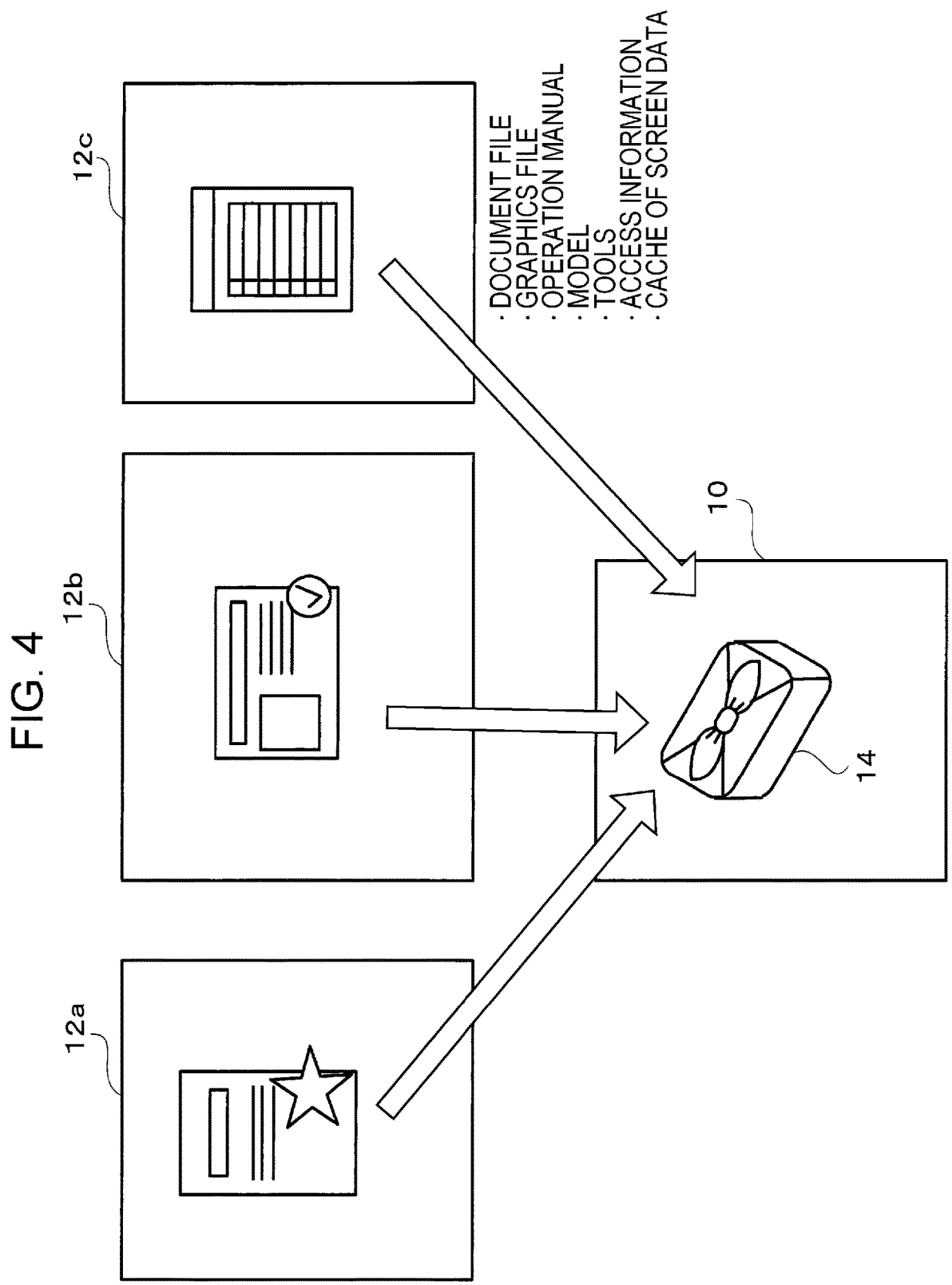
FIG. 4 illustrates a data storage module of the exemplary embodiment of the present invention.

The data storage module 14 is described in detail with reference to FIG. 4.

The data storage module 14 includes multiple pieces of data in a variety of data formats collected in a single file so that the file is carried. For example, the data storage module 14 includes a document file (document data), a graphics file (graphics data), an operation manual and its related document, a template, tools, URL, user information, information used to access the system 12 from a takeout destination (access information), and a cache of screen data (screen information). Each piece of the data is associated with the screen data acquired when the system 12 is accessed, and is then stored in the data storage module 14. By expanding the data storage module 14 on the terminal apparatus 10, the display 22 displays an operation method of each system 12, an order of access to each system 12, and a procedure of the job. The user operates the terminal apparatus 10 in accordance with a display screen, thereby efficiently performing the job.

Figure 5:
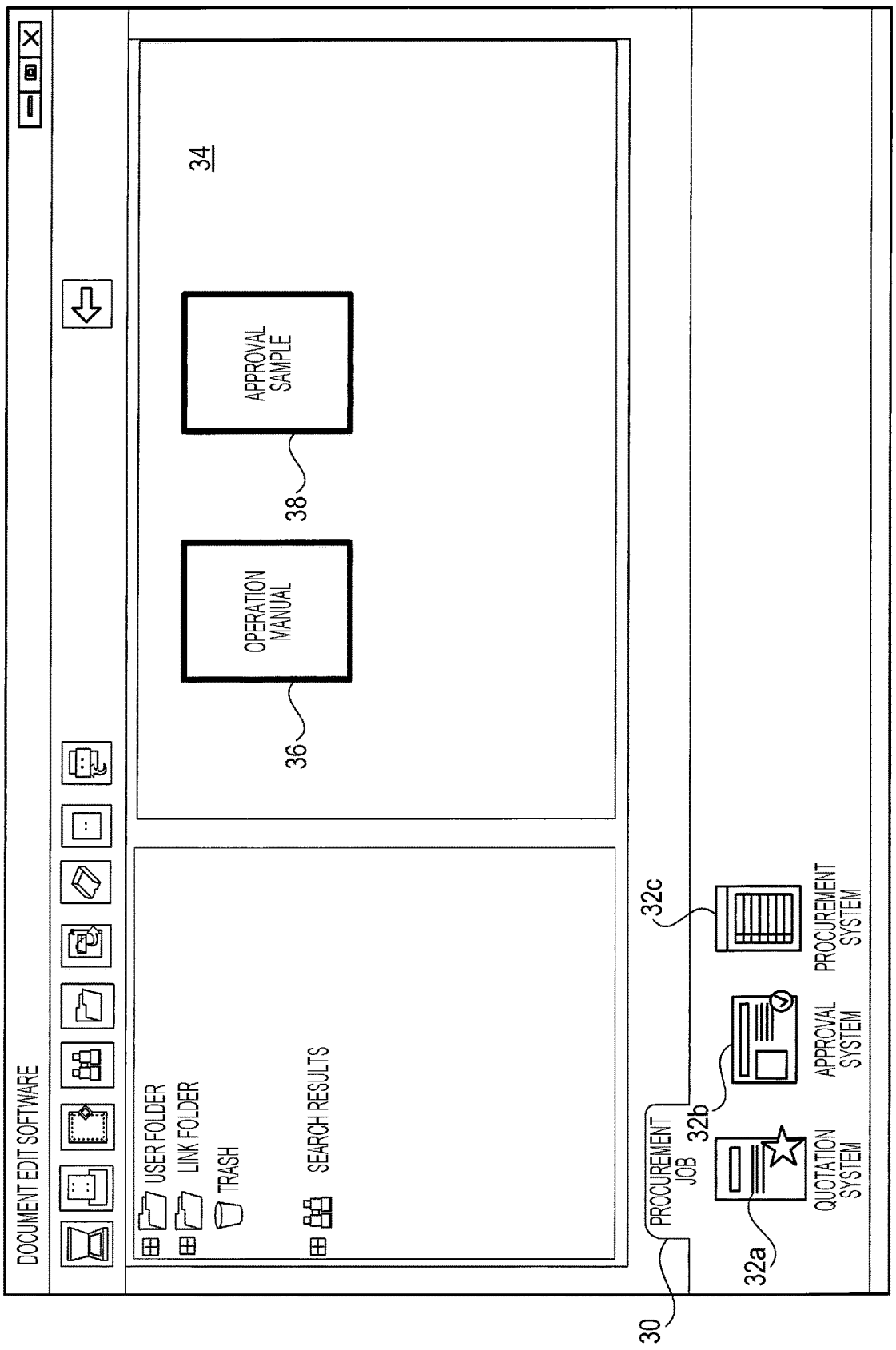
FIG. 5 illustrates a display screen example on which the data storage module of the exemplary embodiment of the present invention is expanded.
Figure 6:
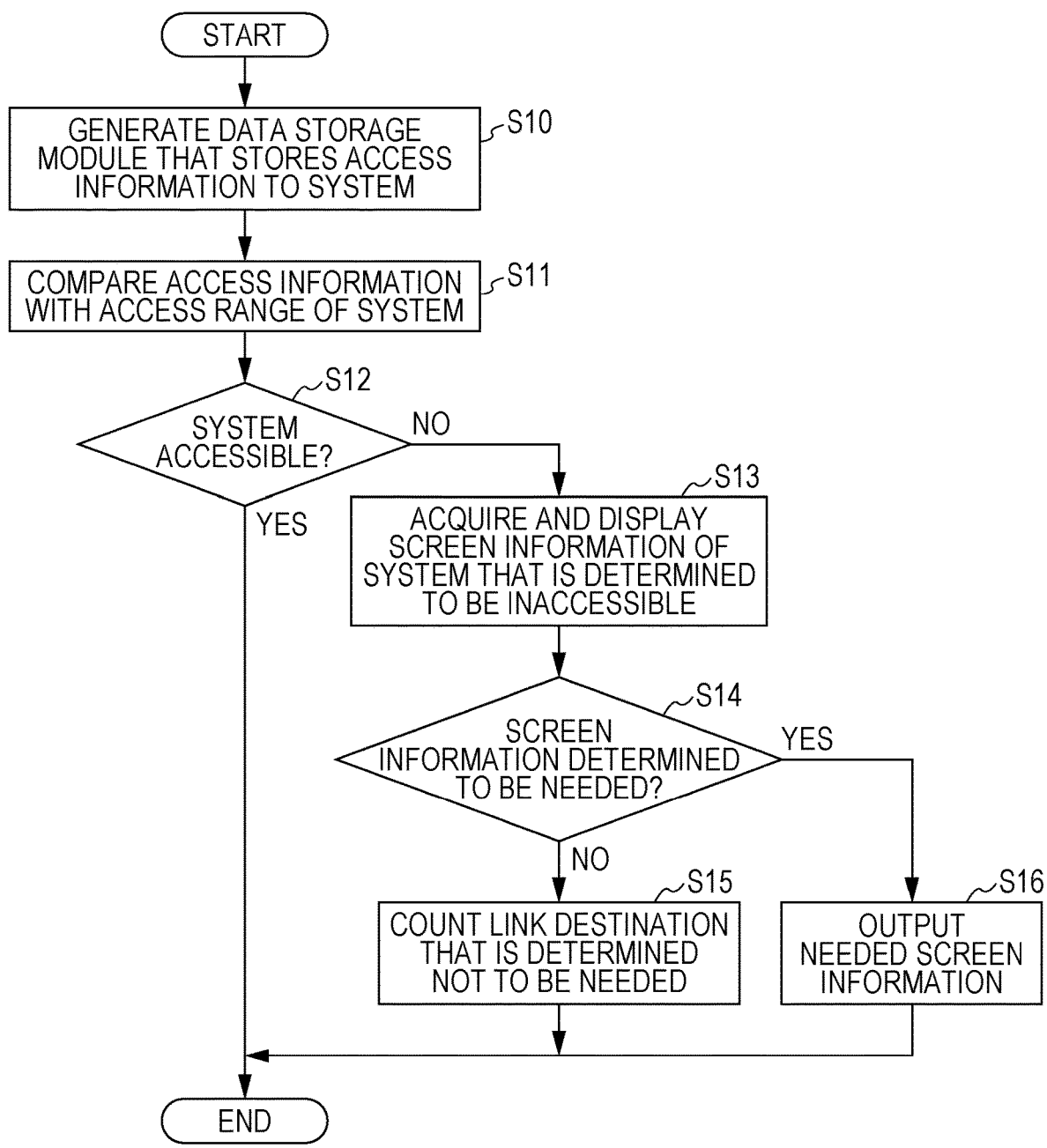
FIG. 6 illustrates a coordinated operation performed by the terminal apparatus with a system in accordance with the exemplary embodiment of the present invention.

When the data storage module 14 is expanded, the document edit software starts up, and a display screen of FIG. 5 is displayed on the display 22.

In accordance with the exemplary embodiment, a procurement job data storage module 14a that is generated using a quotation system, an approval system, and a procurement system of the system 12 is described below.

A tab named "procurement job" for the procurement job data storage module 14a is generated at a tool bar 30. Buttons 32 to access each system 12 is displayed under the tool bar 30. The buttons 32 includes a button 32a to access the quotation system, a button 32b to access the approval system, and a button 32c to access the procurement system. Displayed in a work space 34 are an operation manual 36 related to each button 32, an approval sample 38, and a cache (screen information) of image data, such as WebUI.

The user performs the jobs assigned to the buttons 32 on the tool bar 30 in the order from the left side to the right side. Namely, the user accesses the quotation system 32*a*, the approval system 32*b*, and the procurement system 32*c* in that order, and proceeds with the jobs by referencing the operation manual 36, the approval sample 38, the cache of the screen data, and the like to complete the operations of a series of procurement jobs.

A coordinated process of the terminal apparatus 10 with the system 12 is specifically described with reference to FIG. 6 through FIG. 10.

In accordance with the exemplary embodiment, the procurement job data storage module 14*a* includes, as the system 12, the quotation system, the approval system, and the procurement system and is used to perform product quotation to procurement. A business talk production data storage module 14*b* includes, as the system 12, a customer information registration system, a business talk production system, and a contract finalization system, and is used to perform registration of customers to finalizing contracts. In the processes described below, in accordance with the procurement job data storage module 14*a* and the business talk production data storage module 14*b*, the terminal apparatus 10 determines whether the system 12 is accessible from the takeout destination.

Step S10

The data storage module 14 storing the access information to the system 12 is generated. More specifically, the procurement job data storage module 14*a* and the business talk production data storage module 14*b* are generated. The procurement job data storage module 14*a* stores the URL of each system 12 (the quotation system, the approval system, and the procurement system), user information, access information of the takeout destination, document data related to each system 12 (document file), a template, and the like. The business talk production data storage module 14*b* stores the URL of each system 12 (the customer information registration system, the business talk production system, and the contract finalization system), user information, access information of a takeout destination, document data of each system (document file), a template, and the like.

Step S11

Figure 8:
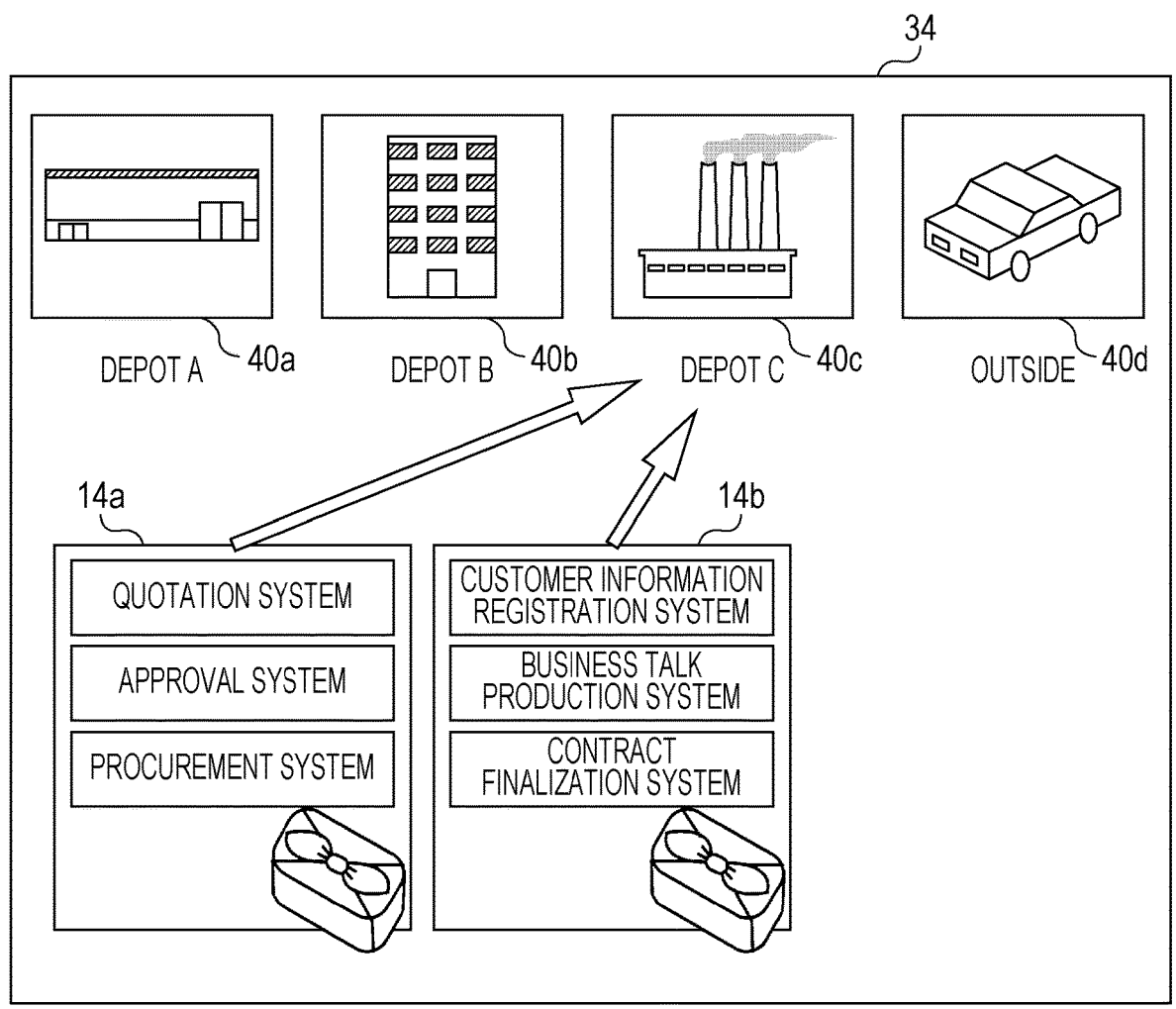
FIG. 8 illustrates a display screen example when a take-out mode is selected on an execution screen of document edit software in accordance with the exemplary embodiment of the present invention.

The access information to the system 12 is compared with the access range information of the system that is defined in advance. The terminal apparatus 10 has a database file that defines an accessible range as illustrated in FIG. 7. More specifically, the terminal apparatus 10 has the access range information indicating whether the system 12 is accessible from the takeout destination, such as a depot A, a depot B, a depot C, or a place outside an office. When a takeout mode is selected with the document edit software started up, a display screen of FIG. 8 is displayed on the display 22.

Displayed in the work space 34 of the display screen are an icon 40*a* of the depot A, an icon 40*b* of the depot B, an icon 40*c* of the depot C, and an icon 40*d* of the outside place. These icons define the access range information of each system 12. By dragging and dropping the data storage module 14 on the icon 40 of the takeout destination, the access range information of the system 12 defined in advance is compared with the access information of the takeout destination.

Step S12

The terminal apparatus 10 determines whether the system 12 is accessible from the takeout destination (the depot A, the depot B, the depot C, or the outside place) specified by the drag and drop operation, and displays the determination results. If the terminal apparatus 10 determines that the system 12 is accessible, the user may access from the takeout destination to the system 12 to proceed with the job. The process thus ends. More specifically, as illustrated in FIG. 8, the procurement job data storage module 14*a* and the business talk production data storage module 14*b* may be dragged and dropped on the icon 40*c* of the depot C as the takeout destination, and the terminal apparatus 10 determines whether each 12 is accessible via the data storage module 14 at the depot C.

Step S13

If the terminal apparatus 10 determines that the data storage module 14 includes data that is not eligible for access to the system 12, the terminal apparatus 10 acquires the latest screen information of a link destination of the system 12, and displays the acquired screen information.

FIG. 9 illustrates a display screen example that indicates whether the procurement job data storage module 14*a* and the business talk production data storage module 14*b* are eligible for access for each system 12 from the depot C.

Figure 9A:
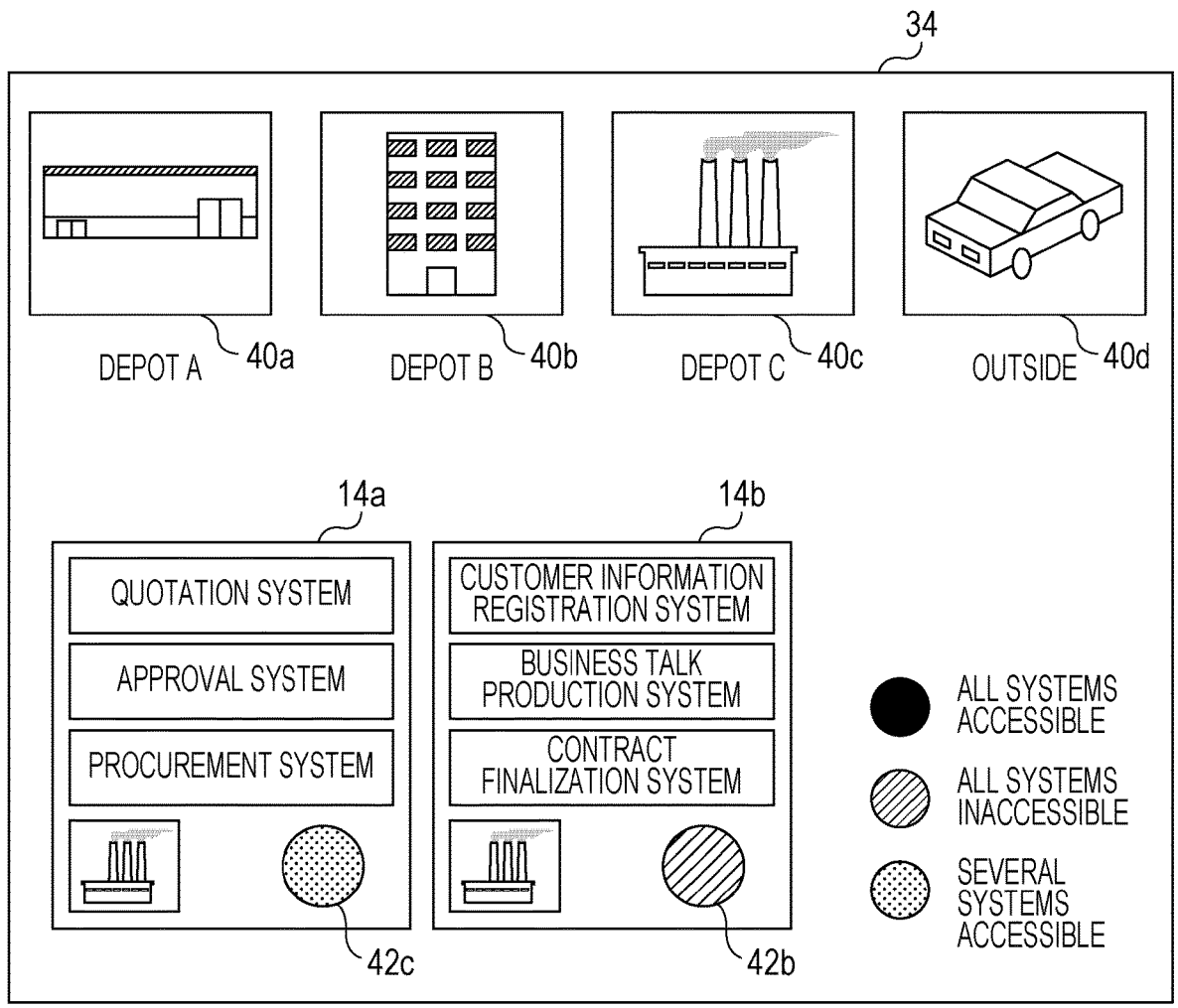
FIGS. 9A and 9B illustrate a display screen example of take-out results at a depot C of FIG. 8 in accordance with the exemplary embodiment of the present invention.
Figure 9B:
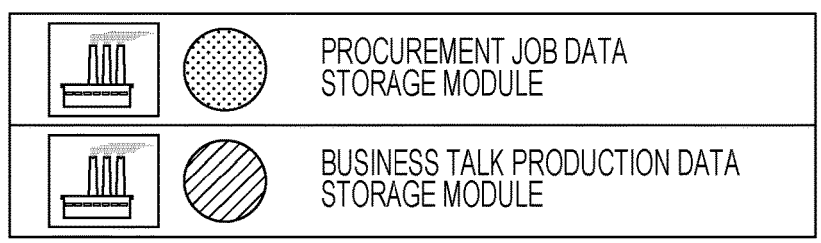

If all the data stored in the data storage module 14 is determined not to be eligible for access to the system 12, a red button 42*a* is displayed on the data storage module 14. If all the data stored in the data storage module 14 is determined to be eligible for access to the system 12, a green button 42*b* is displayed on the data storage module 14. If part of the data stored in the data storage module 14 is determined not to eligible for access to the system 12, a yellow button 42*c* is displayed on the data storage module 14. In other words, the icon 40 specified as the takeout destination and a button 42 responding to the comparison results are displayed on the icon of the data storage module 14. More specifically, as illustrated in FIG. 9A, the icon 40*c* and the yellow button 42*c* are displayed on the procurement job data storage module 14*a*, and the user may recognize at a glance that part of the system 12 (at least one of the quotation system, the approval system, and the procurement system) is inaccessible from the depot C. The icon 40*c* and the green button 42*b* are displayed on the business talk production data storage module 14*b* and the user may recognize at a glance that all the system 12 (the customer information registration system, the business talk production system, and the contract finalization system) is accessible. In place of or in addition to the above-described thumbnail display, the determination results may be displayed in a list as illustrated in FIG. 9B. Alternatively, a report of the results of comparison of the access information to the system with the access range information may be automatically generated, and then displayed.

By clicking on the yellow button 42*c* of the procurement job data storage module 14*a*, items and contents of a link that may be possibly inaccessible are displayed as illustrated in FIG. 10. The items and contents of the link include a hyperlink, system, screen information, and processes. Plural pieces of the screen information (cache) of the quotation system stored as internal information are displayed. The screen information is updated, and the latest screen information is thus displayed. The latest screen information is displayed together with the word New to indicate to the user whether the screen information is updated or not. If plural pieces of the screen information are included, a mouse-over operation, if performed, expands the screen information to improve user friendliness.

Step S14

The terminal apparatus 10 prompts the user to determine whether the screen information displayed in step S13 is needed in performing a job at the takeout destination. One of determination criteria serving to determine whether the screen information is needed or not is that the user may connect the screen to a link destination to check an actual screen at the link destination. More specifically, the terminal apparatus 10 may automatically acquire and update screen information that is determined to be inaccessible, and the user may then select, from the display screen, needed screen information. Since there is no screen information at the initial selection, the terminal apparatus 10 prompts the user to access the system 12. Once the system 12 is accessed, the system 12 stores in the data storage module 14 the URL accessed by the user in association with the screen information. After the user completes the accessing, the system 12 displays these pieces of information to prompt the user to select. At the next time and later, in response to the URL stored in the data storage module 14, the terminal apparatus 10 automatically acquires, updates and displays the screen information to the user to prompt the user to select.

If the screen information is determined not to be needed, processing proceeds to step S15. If the screen information is determined to be needed, processing proceeds to step S16.

The screen information may be a cache of image data. Specifically, the screen information may be a collection hypertext markup language (HTML) and related data in a WebUI system, or image data of a screen shot in a dedicated client other than the WebUI or a digital document that is in a form converted by a virtual printer.

Step S15

If the user determines that the screen information is not needed, the terminal apparatus 10 counts a link destination that is determined not to be needed, and ends the process. When the screen information is displayed at the next time and later, the screen information may be designed to be displayed in the order of smaller to larger number of unneeded counts or the screen information having a larger number of unneeded counts may be designed not to be displayed.

The timing of acquiring the screen information is not limited to the timing when the system 12 is accessed. At the timing when the data storage module 14 is stored onto the terminal apparatus 10a, the terminal apparatus 10a automatically accesses the system 12 to acquire the latest screen information and to automatically store the latest screen information into the data storage module 14.

If the data storage module 14 is scheduled to be taken out to an environment from which accessing is not permitted, according to the user's schedule management system, the terminal apparatus 10a may automatically access the system 12 prior to the takeout to acquire the latest screen information and to automatically store the latest screen information into the data storage module 14. In this way, the user may reference the latest screen information without any conscious operation when the user takes out the data storage module 14.

If an access time period to the system 12 is limited, the terminal apparatus 10a automatically accesses the system 12 immediately prior to the last moment of the access time period to acquire the latest screen information and to automatically store the latest screen information into the data storage module 14. In this way, even if a job is to be performed outside the access time period, the user may proceed with the job while referencing the latest screen information.

Step S16

The terminal apparatus 10a outputs the screen information that the user determines to be needed. More specifically, the user may select and perform one of the process items including "downloading from link destination", "acquiring above image", "printing", and "process not to be performed". The link destination may be stored in HTML, or if the image of any screen information is displayed, the image may be stored on condition that the job is not interfered with. The screen information may be printed using a virtual printer or may be output onto a paper sheet. An output unit having a high frequency of use may be displayed in the screen information selected as needed screen information, or the output unit having a high frequency of use may be automatically implemented and output on the system side. If the image is acquired (the screen information is acquired), the image is automatically stored in the data storage module 14.

The screen information is acquired when the terminal apparatus 10a is in an environment that allows the terminal apparatus 10a to access the system 12. When the terminal apparatus 10a is taken out to an environment as a takeout destination from which the system 12 is not accessible, the acquired screen information is displayed. More specifically, an access is made to the quotation system to acquire the needed screen information before the terminal apparatus 10a is taken out to the depot C, and the user proceeds with the job in accordance with the acquired screen information at the depot C. More specifically, at the depot C, the user is unable to access to the quotation system and to proceed with the job. The user may acquire the screen information related to the quotation system in advance, and reads the screen information from the data storage module 14 at the depot C. The user may input data onto the acquired screen information, and proceed with the job by referencing the acquired screen information.

If the job is performed in accordance with the screen information, the user may recognize that the screen information is displayed and how old the screen information is. In this way, the user may determine whether the job is to be performed based on the displayed screen information and may determine whether the data of the system is an updated version at the time point of the job. This arrangement controls reworking.

The screen information may include data entered by the user. In such a case, the input data is stored in the data storage module 14. When the user returns from the takeout destination, the system 12 may be accessed via the data storage module 14, or the data storage module 14 may move to the terminal apparatus 10b. The interface of the system 12 is automatically called so that the data storage module 14 is reflected on the system 12. In this way, even if the system 12 is not accessible, operations to data updating are performed at the timing of executing the job. The updated contents are automatically reflected when the system 12 becomes accessible. The user saves time in a manner free from suspending the job, and reflects update contents in the job.

Updating of data to the system 12 may be performed when the user is in an environment that allows access to the system 12. Before performing automatic reflection to the system 12, the terminal apparatus 10a may present a message to the user so that the data is reflected after the user has confirmed the contents of the data. For example, if a specific phrase, such as "to be confirmed", is included, the terminal apparatus 10 displays the message to the user before the automatic reflection to the system 12. If the data includes an inconsistency, the user may notice and correct the inconsistency before the automatic reflection.

The user may take out information using a portable terminal apparatus when performing a job with the system 12. The user may confirm in advance whether the system 12 is accessible from the takeout destination. If the system 12 is not accessible at the takeout destination, the terminal apparatus 10 presents the screen information to the user so that the user selects between data to be taken out and data not to be taken out.

If the system 12 is not accessible, the user may proceed with the job by referencing a cached screen (the screen information). More specifically, the user enters data on an off-line basis, thereby efficiently continuing the job. Since only minimum data possible is cached, the size of data is small and may be carried in a single file as the data storage module 14. Even a mobile terminal may easily handle the data storage module 14.

The exemplary embodiment of the present invention is related to the data storage module 14. The present invention is not limited to the data storage module 14. When a job is performed using a system, an external link included in a digital file that may be used or referenced is determined to be accessible from the takeout destination prior to the takeout. The present invention is applicable in such an operation. More specifically, a hyperlink is automatically extracted from the digital file, a determination is made as to whether a keyword specified by the user is included in the hyperlink. If the keyword is included in the hyperlink, the takeout destination is compared with the access range information corresponding to the defined keyword to determine an external link that is not accessible.

In accordance with the exemplary embodiment, the present invention is applied to the document edit software. The present invention is not limited to the document edit software. The present invention is also equally applicable to software as long as the software performs an edit operation on document data (document file), reference data, web data, and the like.

The present invention is also applicable to not only software that edits document data on a personal computer, but also software that edits document data on a portable information terminal apparatus, such as a smart phone, or a tablet terminal apparatus.

In accordance with the exemplary embodiment, a program executed by the terminal apparatus may be delivered in a recorded form on each of computer-readable media, including an electromagnetic recording medium (such as a magnetic tape, a magnetic disk (hard disk drive (HDD)), or a flexible disk (FD)), an optical recording medium (such as an optical disk (compact disk (CD)), or a digital versatile disk (DVD)), a magneto-optical recording disk, and a semiconductor memory (such as a flash ROM). The program may be downloaded via a network, such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A terminal apparatus comprising:
a receiving unit that receives:
   a designation of a destination to which the terminal apparatus will be taken and at which a job is to be performed by a user of the terminal apparatus (i) using a set of information related to the job and (ii) with a system connected to the terminal apparatus; and
   connection information used to connect to the system, wherein the job is performed, at least in part, using link information that permits access from only one or more specific environments; and
a display controller that, before the terminal apparatus is taken to the destination, performs control to display determination results as to whether the terminal apparatus is permitted, based on access information stored on the terminal apparatus, to access the system from the destination.

2. The terminal apparatus according to claim 1,
wherein the display controller performs control to display the determination results using a color which changes depending on the determination results as to whether the system is accessible by the terminal apparatus from the destination.

3. The terminal apparatus according to claim 1,
further comprising an output unit that, if the system is determined to be inaccessible by the terminal apparatus from the destination, outputs the set of information.

4. The terminal apparatus according to claim 2,
further comprising an output unit that, if the system is determined to be inaccessible by the terminal apparatus from the destination, outputs the set of information.

5. The terminal apparatus according to claim 3,
further comprising an acquisition unit that acquires screen information of the system when the system is connected, wherein the output unit outputs the screen information of the system.

6. The terminal apparatus according to claim 4,
further comprising an acquisition unit that acquires screen information of the system when the system is connected, wherein the output unit outputs the screen information of the system.

7. The terminal apparatus according to claim 5,
wherein the output unit outputs successively a plurality of pieces of the screen information in an order from a higher frequency of past use by at least one user to a lower frequency of past use by the at least one user if the acquisition unit has acquired the plurality of pieces of the screen information of the system.

8. The terminal apparatus according to claim 6,
wherein the output unit outputs successively a plurality of pieces of the screen information in an order from a higher frequency of past use by at least one user to a lower frequency of past use by the at least one user if the acquisition unit has acquired the plurality of pieces of the screen information of the system.

9. A terminal control method comprising:
receiving:
   a designation of a destination to which a terminal apparatus will be taken and at which a job is to be performed by a user of the terminal apparatus (i) using a set of information related to the job and (ii) with a system connected to the terminal apparatus; and
   connection information used to connect to the system, wherein the job is performed, at least in part, using link information that permits access from only one or more specific environments; and
performing, before the terminal apparatus is taken to the destination, control to display determination results as to whether the terminal apparatus is permitted, based on access information stored on the terminal apparatus, to access the system from the destination.

10. The terminal apparatus according to claim 1, wherein when system is determined to be inaccessible by the terminal apparatus from the destination, the terminal apparatus downloads the set of information related to the job before the terminal apparatus is taken to the destination.

11. The terminal apparatus according to claim 1, wherein the display controller, before the terminal apparatus is taken to the destination, performs control to display determination results as to whether the terminal apparatus is permitted, based on access information stored on the terminal apparatus, to access the system from the destination.

* * * * *